US010220794B2

(12) United States Patent
Salazar Loera et al.

(10) Patent No.: US 10,220,794 B2
(45) Date of Patent: Mar. 5, 2019

(54) CARGO MANAGEMENT SYSTEM MECHANISM

(71) Applicant: GM GLOBAL TECHNOLOGY OPERATIONS LLC, Detroit, MI (US)

(72) Inventors: Jose Jonathan Salazar Loera, Aguascalientes (MX); Omar Rene Hernandez Sanchez, Toluca (MX)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 0 days.

(21) Appl. No.: 15/641,898

(22) Filed: Jul. 5, 2017

(65) Prior Publication Data
US 2019/0009731 A1     Jan. 10, 2019

(51) Int. Cl.
*B60R 5/04*    (2006.01)
*B60R 7/02*    (2006.01)
*B60R 7/06*    (2006.01)
*B60R 11/00*   (2006.01)

(52) U.S. Cl.
CPC ............... *B60R 11/00* (2013.01); *B60R 5/04* (2013.01); *B60R 7/06* (2013.01); *B60R 2011/0005* (2013.01); *B60R 2011/0007* (2013.01); *B60R 2011/008* (2013.01); *B60R 2011/0036* (2013.01); *B60R 2011/0075* (2013.01)

(58) Field of Classification Search
CPC .. B60R 5/045; B60R 7/02; B60R 7/06; B60R 2011/0005; B60R 2011/0007; B60R 2011/0036; B60R 2011/0075; B60R 2011/008; B60P 7/14

USPC .............. 296/24.34, 37.5, 37.8, 37.12, 37.16
See application file for complete search history.

(56) References Cited

U.S. PATENT DOCUMENTS

| | | | | |
|---|---|---|---|---|
| 6,109,493 A * | 8/2000 | Bieri | ........................ | B60R 7/06 224/281 |
| 6,186,575 B1 * | 2/2001 | Fisher | .................. | B62D 47/003 296/100.02 |
| 6,231,099 B1 * | 5/2001 | Greenwald | ............... | B60R 7/06 220/531 |
| 7,537,257 B2 * | 5/2009 | Watanabe | ................. | B60R 7/04 296/24.46 |
| 2006/0016840 A1 * | 1/2006 | Svenson | ................... | B60R 5/04 224/42.32 |
| 2006/0102671 A1 * | 5/2006 | Fitzpatrick | .............. | B60R 5/048 224/543 |
| 2006/0180623 A1 * | 8/2006 | Reynolds | .................. | B60R 5/04 224/542 |

(Continued)

*Primary Examiner* — Gregory A Blankenship
(74) *Attorney, Agent, or Firm* — Lorenz & Kopf, LLP

(57) ABSTRACT

In accordance with an exemplary embodiment, a vehicle cargo management system includes a body and a plurality of dividers. The body has a first pair of opposing sides and a second pair of opposing sides. The body forms a recess between the first and second pairs of opposing sides. Each side of the first pair of opposing sides includes a groove system, and a plurality of tabs that are configured to move within the groove system. The plurality of dividers are disposed within the recess of the body. Each of the plurality of dividers extends between the first pair of opposing sides, and each of the plurality of dividers is coupled to a respective one of the tabs. Movement of one of the tabs within the groove system causes a respective one of the dividers to move within the recess of the body.

17 Claims, 2 Drawing Sheets

(56) References Cited

U.S. PATENT DOCUMENTS

| | | | |
|---|---|---|---|
| 2006/0289581 A1* | 12/2006 | Bohlke | B60R 5/04 224/543 |
| 2006/0290157 A1* | 12/2006 | Bohlke | B60R 5/04 296/37.6 |
| 2007/0018473 A1* | 1/2007 | Alliger | B60R 5/045 296/24.4 |
| 2015/0054299 A1* | 2/2015 | Yoshizawa | B60R 13/013 296/37.16 |
| 2016/0039474 A1* | 2/2016 | Murray | B62D 25/20 296/24.33 |
| 2016/0090047 A1* | 3/2016 | Huebner | B60R 7/04 296/24.34 |
| 2016/0129949 A1* | 5/2016 | Marable | B60J 7/041 296/37.6 |
| 2017/0036609 A1* | 2/2017 | Huebner | B60R 7/02 |

* cited by examiner

US 10,220,794 B2

CARGO MANAGEMENT SYSTEM MECHANISM

TECHNICAL FIELD

The technical field generally relates to vehicles and, more specifically, to cargo systems for vehicles.

BACKGROUND

Many vehicles include compartments to store cargo of the vehicle occupants. However, in certain situations improved cargo systems may be desired.

Accordingly, it is desirable to provide improved cargo systems for vehicles. Furthermore, other desirable features and characteristics of the present invention will become apparent from the subsequent detailed description of the invention and the appended claims, taken in conjunction with the accompanying drawings and this background of the invention.

SUMMARY

In accordance with an exemplary embodiment, a cargo management system for a vehicle is provided. In one example, the cargo management system includes a boy, a groove system, a plurality of tabs, and a plurality of dividers. The body has a first pair of opposing sides and a second pair of opposing sides. The body forms a recess between the first and second pairs of opposing sides. Each side of the first pair of opposing sides includes a groove system, a plurality of tabs, and a plurality of dividers. The plurality of tabs are configured to move within the groove system. The plurality of dividers are disposed within the recess of the body. Each of the plurality of dividers is coupled to a respective one of the tabs. Movement of one of the tabs within the groove system causes a respective one of the dividers to move within the recess of the body.

Also in one example, each of the plurality of dividers is movable in a sliding manner within the recess of the body based on movement of a respective one of the tabs within one of the groove system.

Also in one example, each of the plurality of dividers is movable in a rotational manner within the recess of the body based on movement of a respective one of the tabs within the groove system.

Also in one example, each of the plurality of dividers is movable in a rotational manner and in a slidable manner within the recess of the body based on movement of a respective one of the tabs within the groove system.

Also in one example, each of the plurality of dividers extends between the first pair of opposing sides.

Also in one example, the groove system includes at least one first section that extends in a substantially horizontal direction; a plurality of second sections, each of the second sections extending substantially parallel to the at least one first section; and a plurality of third sections, each of the third sections extending substantially perpendicular between at least one first section and a respective one of the second sections, and each of the third sections connecting the first section to the respective one of the second sections.

Also in one example, each of the plurality of dividers is configured to: (i) move laterally as a respective one of the tabs moves through the first section of the groove system; and (ii) rotate as the respective one of the tabs moves through the second and third sections of the groove system.

Also in one example, the cargo management system is configured to be disposed within a rear hatch or trunk of the vehicle.

Also in one example, the cargo management system is configured to be disposed within a glove compartment of the vehicle.

Also in one example, the cargo management system is configured to be disposed within a center console of the vehicle.

Also in one example, the cargo management system further includes a cap that is connected to the body.

In accordance with an exemplary embodiment, a cargo management system for a vehicle is provided. In one example, the cargo management system includes a body, a groove system, a plurality of tabs, and a plurality of dividers. The body has a first pair of opposing sides and a second pair of opposing sides. The body forms a recess between the first and second pairs of opposing sides. Each side of the first pair of opposing sides includes a groove system, a plurality of tabs, and a plurality of dividers. The plurality of tabs are configured to move within the groove system. The plurality of dividers are disposed within the recess of the body. Each of the plurality of dividers extends between the first pair of opposing sides. Each of the plurality of dividers is coupled to a respective one of the tabs. Movement of one of the tabs within the groove system causes a respective one of the dividers to move within the recess of the body. Each of the plurality of dividers is movable in a rotational manner and in a slidable manner within the recess of the body based on movement of a respective one of the tabs within the groove system.

Also in one example, the groove system includes at least one first section that extends in a substantially horizontal direction; a plurality of second sections, each of the second sections extending substantially parallel to the at least one first section; and a plurality of third sections, each of the third sections extending substantially perpendicular between at least one first section and a respective one of the second sections, and each of the third sections connecting the first section to the respective one of the second sections.

Also in one example, each of the plurality of dividers is configured to: (i) move laterally as a respective one of the tabs moves through the first section of the groove system; and (ii) rotate as the respective one of the tabs moves through the second and third sections of the groove system.

In accordance with an exemplary embodiment, a vehicle is provided. In one example, the vehicle includes a frame and a cargo management system. The cargo management system is disposed within the frame, and includes a body and a plurality of dividers. The body has a first pair of opposing sides and a second pair of opposing sides. The body forms a recess between the first and second pairs of opposing sides. Each side of the first pair of opposing sides includes a groove system, and a plurality of tabs that are configured to move within the groove system. The plurality of dividers are disposed within the recess of the body. Each of the plurality of dividers extends between the first pair of opposing sides, and each of the plurality of dividers is coupled to a respective one of the tabs. Movement of one of the tabs within the groove system causes a respective one of the dividers to move within the recess of the body, wherein each of the plurality of dividers is movable in a rotational manner and in a slidable manner within the recess of the body based on movement of a respective one of the tabs within the groove system.

Also in one example, the groove system includes at least one first section that extends continuously in a substantially horizontal direction; a plurality of second section sections, each of the second sections extending substantially parallel to the at least one first section; and a plurality of third sections, each of the third sections extending substantially perpendicular between at least one first section and a respective one of the second sections, and each of the third sections connecting the first section to the respective one of the second sections.

Also in one example, each of the plurality of dividers is configured to: (i) move laterally as a respective one of the tabs moves through the first section of the groove system; and (ii) rotate as the respective one of the tabs moves through the second and third sections of the groove system.

Also in one embodiment, the vehicle further includes a rear portion that includes a rear hatch or trunk of the vehicle, and the cargo management system is configured to be disposed within the rear hatch or trunk of the vehicle.

Also in one embodiment, the vehicle further includes a glove box, and the cargo management system is configured to be disposed within the glove box of the vehicle.

Also in one embodiment, the vehicle further includes a front driver seat, a front passenger seat, and a center console that is disposed between the front driver seat and the front passenger seat, and the cargo management system is configured to be disposed within the center console.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
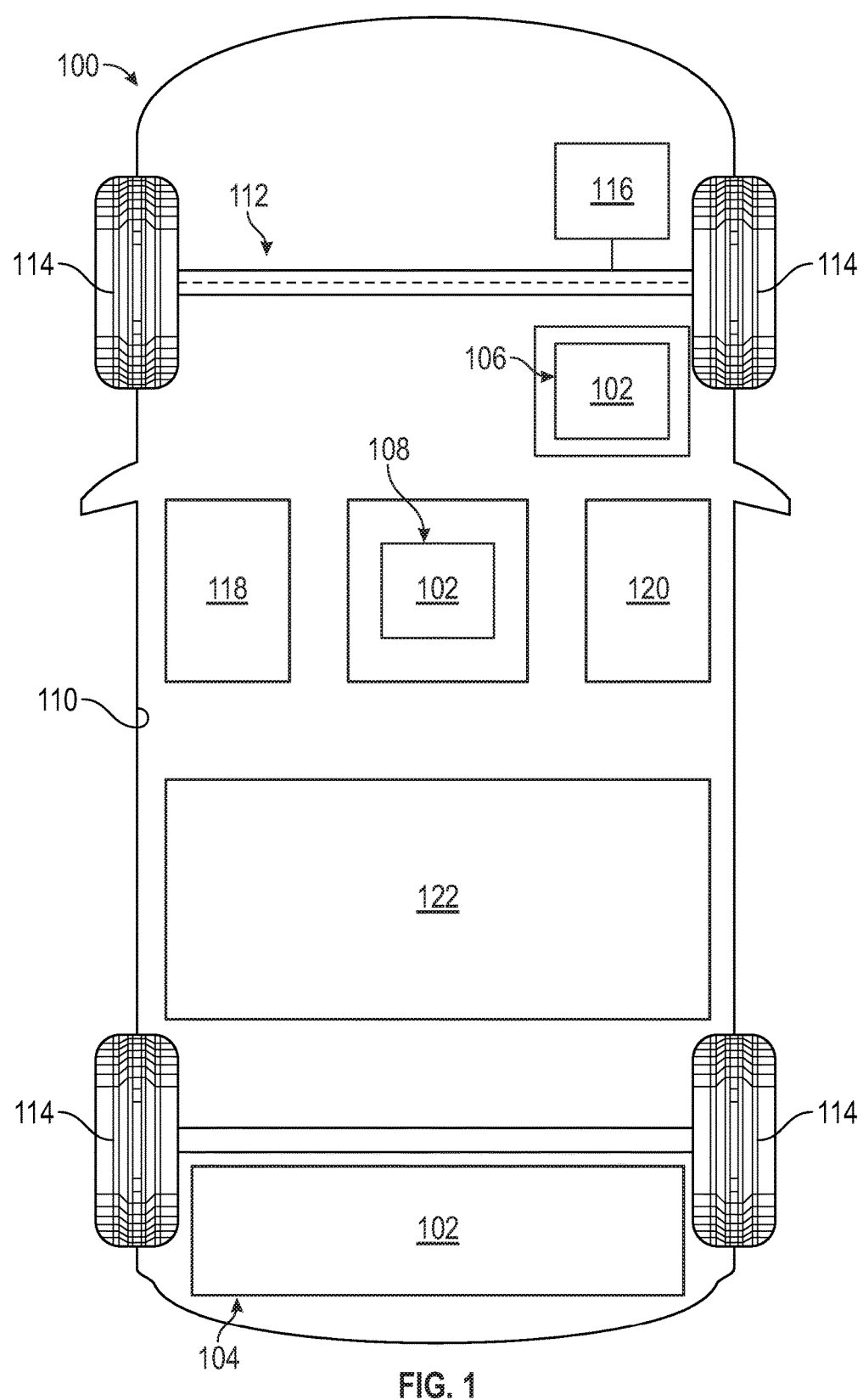
FIG. 1 is a functional block diagram of a vehicle that includes a cargo management system, in accordance with an exemplary embodiment.

FIG. 1 illustrates a vehicle 100, according to an exemplary embodiment. As described in greater detail further below, the vehicle 100 includes one or more cargo management systems 102 for storing personal belongings and/or other cargo of one or more occupants (e.g., drivers and/or passengers) of the vehicle 100, for example as described in greater detail further below in connection with FIG. 1 as well as FIGS. 2 and 3. As depicted in FIG. 1, the cargo management system 102 may be disposed within a rear portion 104 (e.g., trunk or hatch) of the vehicle 100 as well as in a glove compartment 106, center console 108, and/or one or more other locations within the vehicle 100.

The vehicle 100 preferably comprises a land-based automobile. The vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles in certain embodiments. In certain embodiments, the vehicle 100 may also comprise a motorcycle or other vehicle, or other system.

The vehicle 100 includes a body 110 that is arranged on a chassis 112. The body 110 substantially encloses other components of the vehicle 100. The body 110 and the chassis 112 may jointly form a frame (in which the cargo management system 102 and the other vehicle 100 components are disposed, in various embodiments). The vehicle 100 also includes a plurality of wheels 114. The wheels 114 are each rotationally coupled to the chassis 112 near a respective corner of the body 110 to facilitate movement of the vehicle 100. In one embodiment, the vehicle 100 includes four wheels 114, although this may vary in other embodiments (for example for trucks and certain other vehicles).

A drive system 116 is mounted on the chassis 112, and drives the wheels 114. The drive system 116 preferably comprises a propulsion system. In certain exemplary embodiments, the drive system 116 comprises an internal combustion engine and/or an electric motor/generator, coupled with a transmission thereof. In certain embodiments, the drive system 116 may vary, and/or two or more drive systems 116 may be used. By way of example, the vehicle 100 may also incorporate any one of, or combination of, a number of different types of propulsion systems, such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, a combustion/electric motor hybrid engine, and an electric motor.

Also as depicted in FIG. 1, in various embodiments, the vehicle 100 includes occupant seating that includes front seats 118, 120 (e.g., a front driver seat 118 and a front passenger seat 120, in one embodiment), one or more rear seats 122. Also in the depicted embodiments, the vehicle 100 also includes the above-referenced center console 108 that is disposed between the front seats 112, 114 (e.g., between the front driver seat 118 and the front passenger seat 120, in one embodiment). Also in one embodiment, the above-referenced glove box 106 is disposed in front of the front passenger seat 120, and the rear portion (e.g., hatch or trunk) 104 is disposed behind the rear seats 122.

The cargo management system 102, as mentioned above, is configured for storing personal belongings and/or other cargo of one or more occupants (e.g., drivers and/or passengers) of the vehicle 100. As depicted in FIG. 1, in certain embodiments, multiple cargo management system 102 may be disposed in different locations within the vehicle 100, including the rear portion 104 (e.g., trunk or hatch) of the vehicle 100, the glove compartment 106, the center console 108, and/or one or more other locations within the vehicle 100. In another embodiment, a single cargo management system 102 is disposed in the rear portion 104 (e.g., trunk or hatch) of the vehicle 100. It will be appreciated that the number and location of the cargo management systems 102 may vary in different embodiments.

As explained in greater detail below in connection with FIGS. 2 and 3, in various embodiments the cargo management system 102 includes movable dividers for adapting the size of the compartments for increased versatility and use by the occupants of the vehicle 100.

Figure 2:
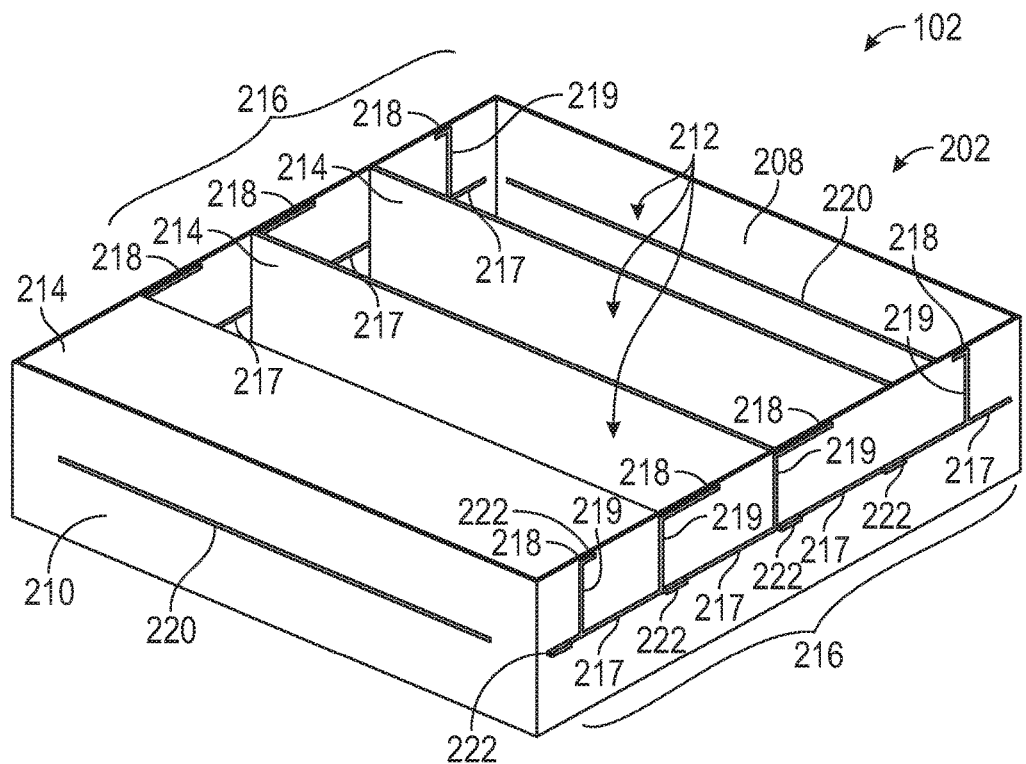
FIG. 2 is a schematic illustration of the cargo management system of FIG. 1, in accordance with an exemplary embodiment.

Specifically, FIG. 2 is a schematic illustration of the cargo management system 102 of FIG. 1, in accordance with an exemplary embodiment. In addition, FIG. 3 is a schematic illustration of a portion of the cargo management system 102 of FIGS. 1 and 2, in accordance with an exemplary embodiment.

Figure 3:
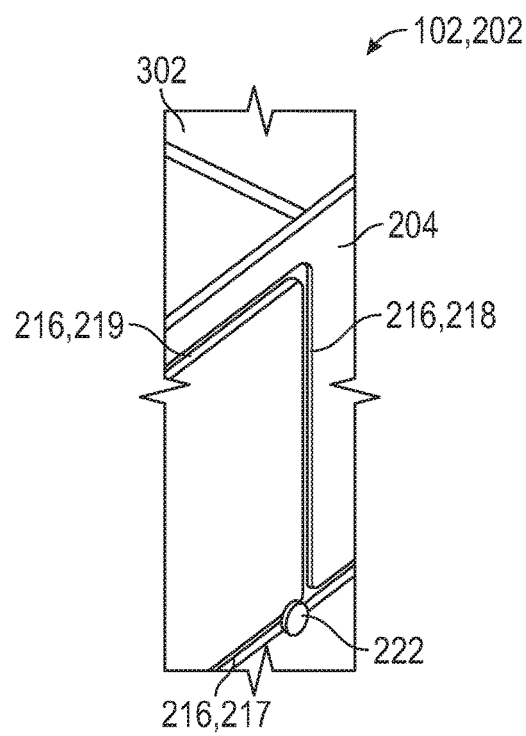
FIG. 3 is a schematic illustration of a portion of the cargo management system of FIGS. 1 and 2, in accordance with an exemplary embodiment.

As depicted in FIGS. 2 and 3, in various embodiments, the cargo management system 102 includes a body 202 in addition to a plurality of dividers 214. In one embodiment, the body 202 is substantially rectangular in all directions, forming a rectangular prism, except with an opening at the top that at least partially defines a recess 212 within the body 202 when the dividers 214 are open (with the dividers 214 being disposed within the recess 212). Cargo, including personal belongings of occupants of the vehicle 100 and/or various other objects, can be placed in the recess 212 within the body. The dividers 214 are movable in both a sliding manner and a rotational manner (as described in greater detail further below), and facilitate organization of cargo stored in the cargo management system 102.

In the depicted embodiment, the body 202 includes a first pair of opposing sides (or walls) 204, 206, and a second pair of opposing sides (or walls) 208, 210. In various embodiments, the first pair of opposing sides 204, 206 are substantially parallel to one another. Also in various embodiments, the second pair of opposing sides 208, 210 are substantially parallel to one another. In addition, in various embodiments, the second pair of opposing sides 208, 210 are substantially perpendicular to, and connect between, the first pair of opposing sides 204, 206, for example as depicted in FIG. 2. Also in various embodiments, the above-referenced recess 212 is formed between the first pair 204, 206 and the second pair 208, 210 of opposing sides, for example as depicted in FIG. 2.

In the depicted embodiment, both of the first pair of opposing sides 204, 206 include a groove system 216 and a plurality of tabs 222. Also in various embodiments, the dividers 214 are coupled to (and, in one embodiment, attached to) the tabs 222. The tabs 222 are configured to be movable through the groove system 216, to thereby move the dividers 214 into various positions as desired by the occupant of the vehicle 100.

Specifically, in various embodiments, each of the dividers 214 is coupled to at least one tab 222. In various embodiments, each divider 214 is coupled to at least one tab 222 on side 204, and to at least one tab 222 on side 206. In certain embodiments, each divider 214 is coupled to a single tab 222 on side 204, and to a single tab 222 on side 206. In certain other embodiments, each divider 214 is coupled to multiple tabs 222 on side 204, and to multiple tabs 222 on side 206. For example, in one embodiment, each divider 214 is coupled to two tabs 222 on side 204 (e.g., at top and bottom corners of a side of the divider 214 adjacent to side 204), and to two tabs 222 on side 206 (e.g., at top and bottom corners of a side of the divider 214 adjacent to side 206). By way of additional example, in another embodiment, each divider 214 is coupled to a first tab 222 that extends along a height of the divider 214 along a side that is attached to side 204, and to a second tab 222 that extends along the height of the divider 214 along a side that is attached to side 206).

In the depicted embodiment, the dividers 214 are each movable in a rotational manner and in a slidable manner within the recess 212 of the body 202 based on movement of a respective one or more of the tabs 222, that are connected or otherwise coupled to the particular divider 214, within the groove system 216.

In various embodiments, and as depicted in FIGS. 2 and 3, the groove system 216 for each side 204, 206 comprises at least one first section 217, a plurality of second sections 218, and a plurality of third sections 219. In certain embodiments, the groove systems 216 on respective sides 204, 206 have the same geometric patterns as one another, or mirror images thereof.

In one embodiment, for each side 204, 206, the at least one first section 217 extends in a substantially horizontal direction (e.g., parallel to, and/or up against, a floor or bottom portion of a vehicle rear hatch or trunk 104, glove compartment 106, center console 108, and/or other part of the vehicle 100 in which the cargo management system 102 is disposed). In certain embodiments, the first section 217 may extend continuously across the entirety (or near entirety) of the respective side 204, 206. In certain other embodiments, there may be breaks in the first section 217 along the respective side 204, 206, and/or there may be multipole first sections 217 across the respective side 204, 206.

Also in one embodiment, each of the second sections 218 extends substantially parallel to the at least one first section 217. In the depicted embodiment, one second section 218 is provided from each side 204, 206 for each divider 214, located near opposing top edges of the divider 214. However, this may vary in other embodiments.

Also in one embodiment, each of the third sections 219 extends substantially perpendicular between the first section 217 (or a respective first section 217) and a respective second section 218. In addition, also in one embodiment, each of the third sections 219 connects the first section 217 (or a respective first section 217) to the respective one of the second sections 218.

Also in various embodiments, each of the dividers 214 is configured to move in different directions and manners based on movement of the tabs 222 that are connected to or otherwise coupled to the divider 214 (e.g., with the movement being the result of the occupant's engagement of the tabs 222 and/or the dividers 214). Specifically, in one embodiment, each divider 214 is configured to: (i) move laterally as a respective tab(s) 222 move through the first section 217 (or a respective first section 217) of the groove system 216; and (ii) rotate as the respective tab(s) move through the second and third sections 218, 219 of the groove system 216.

For example, in the configuration shown in FIG. 2, one divider 214 (on the left of the body 202) has been rotated to a closed position (in which the divider 214 is substantially perpendicular to the sides 204, 206, 208, and 210), thereby partially closing the recess 212 for one compartment at that location. By way of additional example, also in the position shown in FIG. 2, the other two dividers 214 are in an open position (in which these two dividers 214 are substantially parallel to sides 208, 210 and perpendicular to sides 204, 206), in which cargo items can be placed into the body 202 via the recess 212 and stored and sorted into separate compartments via the dividers 214.

In various embodiments, each of the dividers 214 extends between sides 204 and 206. In FIG. 2, three dividers 214 are depicted. However, the number of dividers 214 may vary in different embodiments. In addition, as depicted in FIG. 2, the dividers 214 are substantially rectangular. However, this may vary in other embodiments.

Also as depicted in FIG. 2, in one embodiment the second pair of opposing sides 208, 210 both include additional grooves 220. In various embodiments, the additional grooves 220 may be used to further configure the cargo management system 102 (for example by inserting additional tabs 222 and/or dividers 214).

In various embodiments, the cargo management system 102 (including the body 202, the dividers 214, and the tabs 222) is made of one or more metals. In certain embodiments, one or more of these components may be made of one or more plastic materials, wood, and/or one or more other materials.

In addition, in certain embodiments, as depicted in FIG. 3, the cargo management system 102 also includes a cap 302. In various embodiments, the cap 302 is disposed near a top portion of the body 202, and prevents or inhibits unwanted rotation and translation of the cargo management system 102 and/or components thereof. In one embodiment, the cap 302 is made of rubber. However, this may vary in other embodiments.

Accordingly, in various embodiments, a cargo management system is provided. In various embodiments, the cargo management system includes a body that includes a plurality of tabs and a groove system, along with a plurality of adjustable dividers. In various embodiments, the dividers are movable in sliding and rotational manners via movement of the tabs within the groove system, for example during engagement by a vehicle occupant.

It will be appreciated that the cargo management devices, mechanisms, and systems, and associated vehicles, may vary from those depicted in the Figures and described herein. For example, the vehicle 100, the cargo management system 102, and the components thereof may vary from those depicted in FIGS. 1-3 and described in connection therewith, in various embodiments.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A cargo management system for a vehicle, the cargo management system comprising:
   a body having a first pair of opposing sides and a second pair of opposing sides, the body forming a recess between the first and second pairs of opposing sides, and each side of the first pair of opposing sides including:
   a groove system; and
   a plurality of tabs configured to move within the groove system; and
   a plurality of dividers within the recess of the body, each of the plurality of dividers coupled to a respective one of the tabs, wherein movement of one of the tabs within the groove system causes a respective one of the dividers to move within the recess of the body;
   wherein the groove system comprises:
   at least one first section that extends in a substantially horizontal direction;
   a plurality of second sections, each of the second sections extending substantially parallel to the at least one first section; and
   a plurality of third sections, each of the third sections extending substantially perpendicular between at least one first section and a respective one of the second sections, and each of the third sections connecting the first section to the respective one of the second sections.

2. The cargo management system of claim 1, wherein each of the plurality of dividers is movable in a sliding manner within the recess of the body based on movement of a respective one of the tabs within one of the groove system.

3. The cargo management system of claim 1, wherein each of the plurality of dividers is movable in a rotational manner within the recess of the body based on movement of a respective one of the tabs within the groove system.

4. The cargo management system of claim 1, wherein each of the plurality of dividers is movable in a rotational manner and in a slidable manner within the recess of the body based on movement of a respective one of the tabs within the groove system.

5. The cargo management system of claim 1, wherein each of the plurality of dividers extends between the first pair of opposing sides.

6. The cargo management system of claim 1, wherein each of the plurality of dividers is configured to:
   move laterally as a respective one of the tabs moves through the first section of the groove system; and
   rotate as the respective one of the tabs moves through the second and third sections of the groove system.

7. The cargo management system of claim 1, wherein the cargo management system is configured to be disposed within a rear hatch or trunk of the vehicle.

8. The cargo management system of claim 1, wherein the cargo management system is configured to be disposed within a glove compartment of the vehicle.

9. The cargo management system of claim 1, wherein the cargo management system is configured to be disposed within a center console of the vehicle.

10. The cargo management system of claim 1, further comprising a cap connected to the body.

11. A cargo management system for a vehicle, the cargo management system comprising:
    a body having a first pair of opposing sides and a second pair of opposing sides, the body forming a recess between the first and second pairs of opposing sides, and each side of the first pair of opposing sides including:
    a groove system; and
    a plurality of tabs configured to move within the groove system; and
    a plurality of dividers within the recess of the body, each of the plurality of dividers extending between the first pair of opposing sides, and each of the plurality of dividers coupled to a respective one of the tabs, wherein movement of one of the tabs within the groove system causes a respective one of the dividers to move within the recess of the body, wherein each of the plurality of dividers is movable in a rotational manner and in a slidable manner within the recess of the body based on movement of a respective one of the tabs within the groove system;
    wherein the groove system comprises:
    at least one first section that extends in a substantially horizontal direction;
    a plurality of second sections, each of the second sections extending substantially parallel to the at least one first section; and
    a plurality of third sections, each of the third sections extending substantially perpendicular between at least one first section and a respective one of the second sections, and each of the third sections connecting the first section to the respective one of the second sections.

12. The cargo management system of claim 11, wherein each of the plurality of dividers is configured to:
move laterally as a respective one of the tabs moves through the first section of the groove system; and
rotate as the respective one of the tabs moves through the second and third sections of the groove system.

13. A vehicle comprising:
a frame; and
a cargo management system disposed within the frame, the cargo management system comprising:
a body having a first pair of opposing sides and a second pair of opposing sides, the body forming a recess between the first and second pairs of opposing sides, and each side of the first pair of opposing sides including:
a groove system; and
a plurality of tabs configured to move within the groove system; and
a plurality of dividers within the recess of the body, each of the plurality of dividers extending between the first pair of opposing sides, and each of the plurality of dividers coupled to a respective one of the tabs, wherein movement of one of the tabs within the groove system causes a respective one of the dividers to move within the recess of the body, wherein each of the plurality of dividers is movable in a rotational manner and in a slidable manner within the recess of the body based on movement of a respective one of the tabs within the groove system;
wherein the groove system comprises:
at least one first section that extends continuously in a substantially horizontal direction;
a plurality of second section sections, each of the second sections extending substantially parallel to the at least one first section; and
a plurality of third sections, each of the third sections extending substantially perpendicular between at least one first section and a respective one of the second sections, and each of the third sections connecting the first section to the respective one of the second sections.

14. The vehicle of claim 13, wherein each of the plurality of dividers is configured to:
move laterally as a respective one of the tabs moves through the first section of the groove system; and
rotate as the respective one of the tabs moves through the second and third sections of the groove system.

15. The vehicle of claim 13, further comprising:
a rear portion comprising a rear hatch or trunk of the vehicle;
wherein the cargo management system is configured to be disposed within the rear hatch or trunk of the vehicle.

16. The vehicle of claim 13, further comprising:
a glove compartment;
wherein the cargo management system is configured to be disposed within the glove compartment.

17. The vehicle of claim 13, further comprising:
a front driver seat;
a front passenger seat; and
a center console disposed between the front driver seat and the front passenger seat;
wherein the cargo management system is configured to be disposed within the center console.

* * * * *